United States Patent [19]

Ress et al.

[11] 4,010,396
[45] Mar. 1, 1977

[54] DIRECT ACTING PLASMA ACCELERATOR

[75] Inventors: Thomas I. Ress, Buena Park; George V. Nolde, Santa Monica, both of Calif.

[73] Assignee: Kreidl Chemico Physical K.G., Schaan, Liechtenstein

[22] Filed: Nov. 26, 1973

[21] Appl. No.: 418,857

[52] U.S. Cl. .................... 313/231.3; 176/1; 176/8; 310/11; 313/361; 313/161; 315/111.6; 315/111.7

[51] Int. Cl.² ............ H01J 3/34; H05H 1/10; H05H 1/12

[58] Field of Search .............. 313/62, 359, 231.3, 313/231.4, 231.5, 359–363, 161; 328/233–238; 315/111.4, 111.5, 111.6, 111.7; 176/1, 8; 310/11

[56] References Cited

UNITED STATES PATENTS

| | | | |
|---|---|---|---|
| 2,658,999 | 11/1953 | Farly | 313/62 X |
| 2,790,902 | 4/1957 | Wright | 328/235 |
| 2,890,348 | 6/1959 | Ohkawa | 313/62 X |
| 2,979,635 | 4/1961 | Burleigh | 313/62 X |
| 3,324,325 | 6/1967 | Briggs | 313/62 |
| 3,344,357 | 9/1967 | Blewett | 328/235 X |
| 3,459,988 | 8/1969 | Russell | 328/233 X |
| 3,719,554 | 3/1973 | Cole | 328/233 X |
| 3,794,927 | 2/1974 | Fleischer et al. | 328/234 |

*Primary Examiner*—Siegfried H. Grimm

[57] ABSTRACT

Charged particles are entrained on a straight or curved path by a traveling magnetic field moving along that path with its magnetic flux vector transverse thereto. The general direction of entrainment is the same for particles of either polarity. The initial relative velocity between the traveling field and the particle drives the latter into motions along a quasi-cycloidal trajectory in the direction of field travel at an average particle speed nearly equal to the field velocity. Streams of charged particles may be accelerated into streams separated from any material objects such as vessel walls, magnetic structures, electrodes, etc. This confinement is achieved predominantly by the balanced interaction of the forces exerted on the particles by the traveling magnetic field and their inertial forces. Auxiliary confining fields may be applied for redirecting to the main stream any particles scattered by secondary effects. The traveling field may be generated by a group of electromagnets, with or without cores, spaced along the path and excited in staggered phase relationship; by an angular offsetting of the polar axes of adjoining electromagnets, the quasi-cycloidal trajectories may be twisted into spacial curves designed to keep the particle stream within preselected boundaries without the need for separate magnetic focussing fields. Periodic reversals of the travel direction of the magnetic field result in reciprocation of the particle streams for inducing collisions between oppositely moving particle streams in adjoining sections. Laminar particle flow is produced by providing a concentrated charged particle source emitting bursts of said particles in a preselected phase relationship to the traveling magnetic field. The quasi-cycloidal trajectories may be substantially straightened or otherwise modified by the application of specially shaped pole pieces.

13 Claims, 20 Drawing Figures

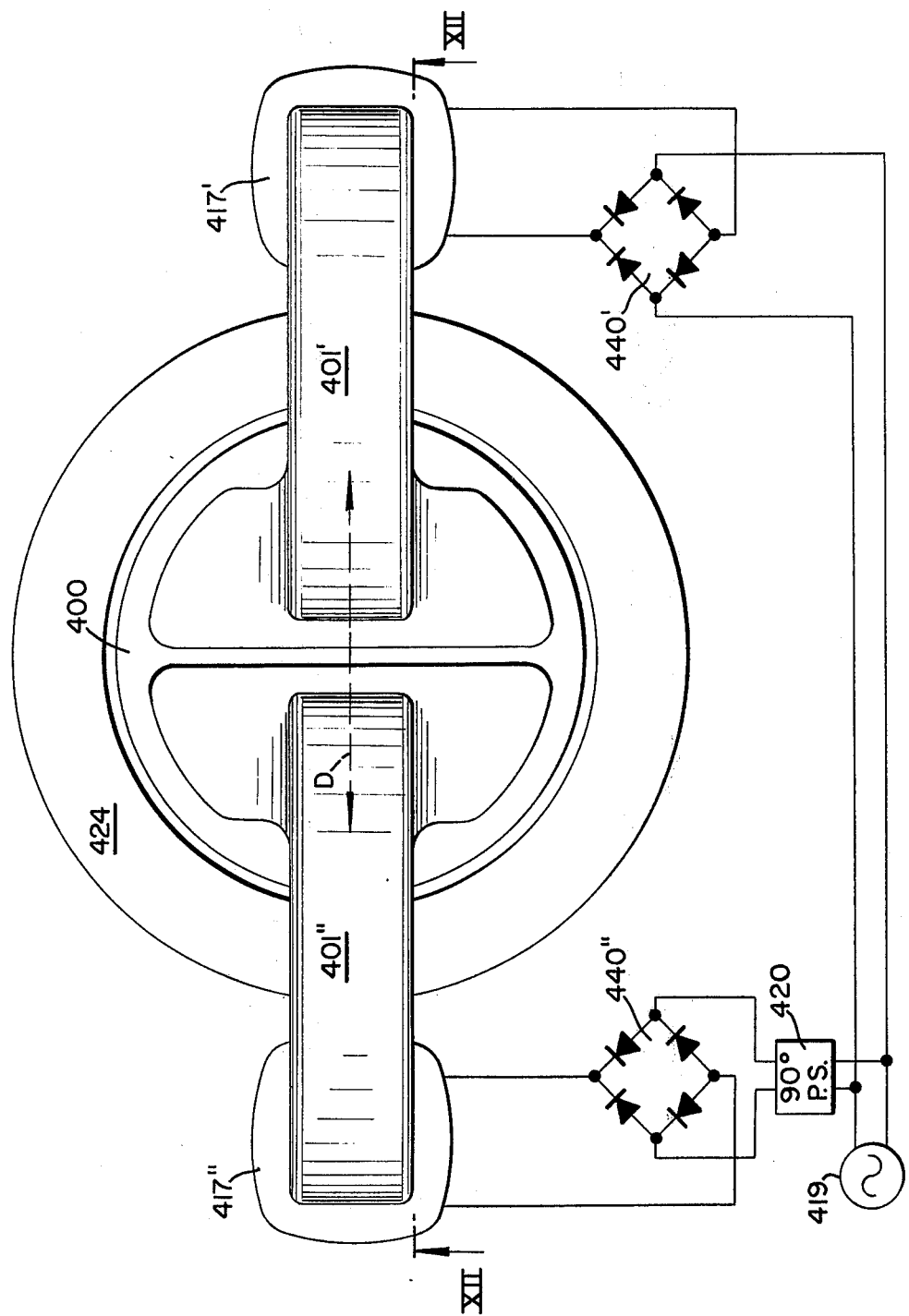

DIRECT ACTING PLASMA ACCELERATOR

1. FIELD OF THE INVENTION

Our present invention relates to a particle accelerator in which ions and electrons forming a plasma are driven along a predetermined path to attain a certain speed, e.g. for the purpose of inducing chemical or nuclear reactions.

2. BACKGROUND OF THE INVENTION

In conventional systems of the Cyclotron type the particles are accelerated in a high-frequency electric field set up between hollow segmental electrodes, termed dees, the particles being constrained by a constant transverse magnetic field to spiral outwardly in a path centered on the field axis. The frequency of the electric driving field, acting intermittently upon the particles, must be correlated with their mass/charge ratio which therefore must be the same for all particles to be accelerated in synchronism. Moreover, the sense of acceleration and therefore the direction of motion depends on the polarity of the particle. If an attempt were made to accelerate a gaseous plasma in such systems, the polarity dependent direction of motion of the particles and the diversity of their mass-charge ratios would cause turbulence and untimely collisions between particles travelling at different velocities and directions; the resulting non-uniformity of particle velocities prevents the attainment of controlled conditions for the desired nuclear or chemical reactions.

Similar considerations apply to Betatrons and Tokomak accelerators, in which particles of different polarities are driven in opposite directions by a stationary magnetic field perpendicular to their orbital plane whose intensity increases monotonically during each propulsion cycle. When driving a plasma, most of the field energy is transferred to the electrons, which causes power losses and excessive turbulence of the plasma flow.

Another conventional way of imparting high kinetic energies to molecular particles is by heating a gas to a very high temperature, such as that produced by a plasma arc. This method of particle acceleration, however, is uneconomical since it produces a wide range of particle energies, not confined to the characteristic energy level of a desired reaction, in accordance with the Maxwell-Boltzmann law of energy distribution in a heated gas. Moreover, the unwanted energy bands may also give rise to parasitic side reactions.

In an application filed on even date herewith by one of use, Thomas I. Ress, Ser. No. 418,858, now U.S. Pat. No. 3,935,503 there has been disclosed a system for the synchronous entrainment of charged particles (electrons and ions) by a magnetic field revolving with constant angular velocity about the axis of a closed vessel of generally cylindrical or toroidal configuration, the angular velocity of this field so chosen that the particles acquire the desired energy. If the power of the magnetic drive field per unit volume exceeds a critical magnitude, such rotary accelerator configurations cause, during start-up, many particle collisions and rapid ionization of the entire gas volume admitted into the vessel, followed by the acceleration of a circular plasma stream to an average velocity equal to the velocity of the rotary drive field. An auxiliary magnetostatic field aligned with the axis of field rotation limits the radially outward excursions of the plasma particles.

3. OBJECTS OF THE INVENTION

The primary object of our present invention is the effective utilization, in a particle accelerator, of specific dynamic effects caused by the unidirectional entrainment of both positively and negatively charged particles of a plasma by a traveling magnetic field.

A more particular object of our invention is to utilize said entrainment method for containing the moving plasma particles within pre-determined flow boundaries mainly by the balanced interaction of electro-magnetic forces exerted by the traveling magnetic field and inertial reaction forces of the driven particles.

Another object of our invention is to drive the entrained plasma within a vessel into rapid reciprocating oscillations based on the energy flow from the traveling field during particle acceleration, and the return of their kinetic energy during their deceleration to the driving field. This resonance phenomenon involving mostly the plasma ions in proportion to their mass may be used for prolonging the residency and interaction time of plasma particles in the accelerator vessel to increase the rate of chemical or nuclear reactions.

A further object of this invention is to provide two or more or such oscillating plasma streams reciprocating in mutually opposite directions, for inciting energetic collisions of entrained plasma ions at the junctions of said reciprocating plasma streams.

Another object of our invention is the reduction of lateral expansion of the plasma stream during its acceleration by the traveling magnetic field as caused by thermal motions of the plasma ions and random collision effects. This is achieved by magnetostatic or electrostatic fields or relatively small intensities for deflecting any deviating plasma ions toward the preselected flow path of the plasma stream.

Another important object of this invention is the generation of a dense mono-energetic plasma stream of predominantly laminar flow along a preselected open-ended path by injecting the plasma intermittently at the start of the open-ended path, and timing the plasma injection in a synchronous phase relationship to the traveling magnetic field applied to said path.

A very important object of our invention is the utilization of the very large mass flow rates achievable by plasma accelerators according to this invention, in which the plasma stream densities are not limited by the space charge effects of ion accelerators. These large mass flow rates can be applied in certain effective processing configurations for producing chemical compounds at fast rates, for the controlled excitation of nuclear fusion of hydrogen isotopes as a source of neutrons and thermal power, and for generating mechanical reaction forces for the propulsion of space vehicles.

4. SUMMARY OF THE INVENTION

Our invention is based upon the realization that the trajectory of a charged particle overtaken by a traveling magnetic field of constant intensity and velocity, whose vector is perpendicular to its line of motion, is a cycloid whose vertices have tangents parallel to this line of motion and whose cusps are spaced from these tangents by a distance 2R where R is the radius of a circle which the particle describes about the central field vector of its zone of entrainment as seen by an observer moving with that field vector. As is well known per se, a charged particle of mass $m$ and charge $q$, entering a stationary and constant magnetic field of intensity B at a linear speed $v$ perpendicular to the field, is deflected into a circular path whose radius R is given by $$R = vm/qB$$

where $R$, $v$, $m$, $q$ and $B$ are measured in compatible units (e.g. meters, meters per second, kilograms, coulombs and webers per meter$^2$, respectively). If, now, the particle is substantially stationary and a magnetic field of intensity B moves past it with velocity $v$, the foregoing formula still applies but the path of the particles as seen from a fixed observation point is now a cycloid of pitch $2\pi R$ and height 2R. This height 2R represents the extent of the lateral excursion of the entrained particle, transversely to the line of field motion, and must evidently be less than the internal width of the vessel (i.e. its dimension perpendicular to the line of motion and to the field vector) if collisions between the particle and the wall of the vessel are to be avoided. Since the radius R depends (with $v$ and B constant) on the ratio $m/q$, this width must be so chosen as to accommodate those particles whose mass/charge ratio is the greatest among those introduced into the vessel for magnetic entrainment.

In the practical realization of our invention as described hereinafter, fluctuations of magnetic-field intensity and/or velocity lead to deviations of the particle trajectories from an exactly cycloidal shape. The actual trajectories, therefore, may be described as quasi-cycloidal.

If the charged particles are randomly introduced into or generated within the accelerator vessel, they will be spread out on both sides of the centerline of the vessel so that some of them may start out in a position relatively close to the sidewall facing the convex side of their cycloid. In order to prevent even particles on the "wrong" side of the centerline from striking a sidewall, the distance between that sidewall and the centerline should be well in excess of 2R as defined above with reference to the particles with widest excursion.

In principle, a traveling magnetic field adapted to entrain charged particles along cycloidal trajectories could be uniform over the entire path length; thus, a toroidal vessel might be bracketed between two concentric annular pole shoes of a permanent or electricaly excited constant magnet mechanically rotated at high speed about its axis. Such a system, however, is not very practical since for mechanical reasons the traveling speed of the magnetic field must be kept rather low. We therefore envisage as a preferred solution the generation of a traveling field with the aid of a set of electromagnets spaced along the particle track and excited in staggered phase relationship by a source of high-frequency current. The time-variant magnetic field gradients thus generated by the set of electromagnets produce the equivalent effect of a moving magnetic field, whose peaks and valleys of field intensity are moving along the set of electromagnets in form of a "magnetic wave" in the direction of the gradients.

These electromagnets have cores trained upon the vessel wall, but, for closer spacing, could also be designed as overlapping wire coils supported on a common ferromagnetic yoke. Such a mode of energization, similar to that of the field windings of a polyphase electric motor, enables selective reversal of the direction of field travel (and therefore of the mean direction of particle motion) by a switching of the phase leads in the supply circuit. With rapid switching, advantageously by electronic means, the particles may be made to shuttle back and forth along the same or complementary quasi-cycloidal trajectories for an indefinite period during which their kinetic energy is available for the intended purpose. This feature of our invention may be utilized, for example, to promote sustained collisions between two groups of particles reciprocating in mutually opposite directions in adjoining vessel sections. If the system comprises only two magnets alternately excited with unidirectional current, or with alternating current in the presence of a biasing field, reversal of motion is automatic.

In accordance with another important feature of our invention, the driving electromagnets generating the travelling field may have their polar axes — which are trained upon the centerline of the tubular vessel — angularly offset from one another, the offset between adjoining electromagnets being less than 180° so as to vary the spatial orientation of the magnetic field vector as it progresses along the track; the relative tilting of these polar axes then constrains the particles to follow a trajectory that is twisted about the centerline whereby the driving field becomes successively effective in different planes to control the movement of the particles and to prevent them from straying. By this means, the need for an axially oriented magnetostatic focusing field — as disclosed in the concurrently filed Ress application for a toroidal vessel — is obviated while positive omnidirectional guidance for and confinement of the particles is achieved even with vessels of linear or other noncircular configuration.

Nevertheless, the provision of such magnetostatic focussing means may be beneficial in some instances even in the presence of a helicoidally or otherwise twisted trajectory. In the case of a tubular vessel, in particular, such focusing means may take the form of a coil wound about the vessel and traversed by direct current to set up a steady magnetic field in the direction of its centerline. Such a field does, however, have a distoring effect upon the cycloidal trajectory of the particles and should therefore be limited in its intensity in order to minimize tubulence. Focusing fields may also be generated by one or more elongate magnetic members flanking the vessel, these members advantageously having a permeability of approximately unity so as not to interfere with the traveling field. Thus, they may be constituted by coreless flat coils of copper or other nonmagnetic conductive wiring; they may also be permanently magnetized strips of substantially non-paramagnetic material, i.e. material with a permeability near unity. A suitable material of this description is a barium-ferrite composition marketed under the name INDOX I (permeability 1.15) or INDOX VI (permeability 1.06) by Indiana General Corporation of Valparaiso, IN.

The excitation of a set of spaced-apart electromagnets in staggered phase relationship produces a magnetic driving field in the form of a traveling wave with distinct peaks of alternating magnitude +B and −B. The internal width of the vessel will then have to be well in excess of 4R, as defined above, in order to accommodate both types of cycloids. According to another feature of our invention, however, this width may be reduced by energizing the driving electromagnets with a unipolar pulsating current, obtained by raw rectification of an alternating current, so that the lines of force of all these magnets are codirectionally polarized.

Thus, all particles with common polarity will follow quasi-cycloidal paths bulging in one sense whereas those of the opposite polarity will bulge in the other sense; as the particles of the greatest mass/charge ratio are usually positive ions, the vessel may be dimensioned to accommodate their excursions without much regard to the relatively minor excursions of the accompanying electrons. In fact, the electrons will generally be drawn away from the adjoining vessel wall by the electrostatic attraction of the ion cloud gravitating toward the opposite wall.

Whether the traveling magnetic field consists of a train of moving magnetic-flux waves of alternating or unipolar character, we prefer to adapt the physical spacing of the generating electromagnets to the "pitch" of the cycloid described by the dominant particles of largest mass/charge ratio. Thus since a cycloid of height 2R has a "pitch" equal to $2\pi R$, magnets separated by a distance $2\pi R$ (with R satisfying the aforestated relationship) should be cophasally excited to keep these dominant particles in step with the field. This is particularly desirable in very dense plasma streams, in which the codirectional entrainment of all particles — regardless of their masses and charges — is impeded by space charges and collisions. With angular offsetting of the electromagnets to establish a helicoidal mean path, the pitch of the helix may also be made equal to to this distance $2\pi R$.

If the driving magnets are all excited by alternating instead of unidirectional pulsating currents, the intensity of the traveling field may be modified by superimposing a codirectional steady but advantageously adjustable biasing field upon the moving magnetic vector. This technique of field control is available as long as the steady biasing field is of sufficient strength to override the opposing polarity of the moving field.

If the entry of a particle (especially an ion) into the traveling magnetic field is timed to coincide with a particular phase of the field, the path followed by the particle upon initial acceleration by the magnetic field can be predetermined. Thus it becomes possible, pursuant to a further feature of our invention, to position successive electromagnets along the line of acceleration of the particles by the field of the immediately preceding electromagnets for establishing a path which will be substantially identical for all simultaneously injected particles of like mass/charge ratio which therefore will follow more or less parallel trajectories so as to give rise to an essentially laminar plasma flow. As will be shown in detail hereinafter, such a path will have the general shape of a half-cycloid if the direction of field travel does not change along the track, i.e. if the field gradients move parallel to a fixed line which constitutes the base line of the half-cycloid. However, by changing the direction of the field gradient between consecutive electromagnets we can modify the shape of the trajectory and, in a limiting case, even approach a rectilinear path.

In order to establish the desired direction of field gradient, it is advantageous to provide the electromagnets with pole shoes adjoining one another along boundaries intersecting the centerline of the vessel which preferably is a flattened tube of substantially rectilinear cross-section carrying these pole shoes on its major surfaces. With the magnetic field substantially uniform on either side of the boundary, the field gradient is perpendicular thereto. Near the starting point of the track, these boundaries should be generally parallel to the centerline of the vessel in order to let the injected particles be accelerated in the proper direction. With increasing distance from the starting point, these boundaries progressively approach perpendicularly to the centerline with resulting reduction of acceleration but continued guidance of the particle stream. At the terminal point the cumulative acceleration brings the particle velocity to a value of about twice the speed of the traveling field.

This aspect of our invention, which virtually eliminates losses due to ion collisions and radiation effects, enables the generation of monoenergetic beams powerful enough to initate nuclear reactions, especially if several such beams from a plurality of like accelerators are combined in a common reaction vessel. A reactor of this kind may serve as a neutron source and may also be used as a generator of thermal power.

Other uses of a system according to our invention include the stimulation of chemical reactions by accelerating at least one of the reactants to moderate velocities at which it can be injected into another enclosure filled with an unexcited reactant fluid; alternatively, ions of the several reactants may be brought into mutual collisions by being accelerated in different sections of a common vessel, with the aid of separate sets of driving magnets as described above, so as to move in opposite directions. As our system affords close control of the ion energies, end products of high purity may be obtained without the simultaneous generation of unwanted compounds. This includes, for example, the selective conversion of atmospheric constituents into nitrogn oxides (NO, $NO_2$), the synthesis of ammonia ($NH_3$) from its constituents, or the conversion of oxygen ($O_2$) into ozone ($O_3$); transformation of methane ($CH_4$) or ethane ($C_2H_6$) into acetylene ($C_2H_2$) plus hydrogen is also possible. Higher plasma velocities, readily realizable with our improved accelerator, make it possible to synthesize compounds not obtainable by conventional heating methods.

A system according to our invention may be also used for ion implantation into solid objects for useful and/or ornamental modification of their surface characteristics, e.g., hardness, corrosion resistance, or electrical conductivity.

The very large plasma flow rates achievable by accelerators according to our invention makes it possible to employ them as reaction motors for sustained propulsion and directional control of inter-planetary space vehicles.

In all embodiments of this invention the ions and electrons of a plasma are propelled with equal mean velocity along their tracks. As a consequence, the energy imparted to the electrons amounts to a negligible fraction of the energy transferred to the dominant ions. The characteristic feature of our invention is of fundamental importance for nuclear fusion reactions, since it greatly reduces the turbulence and radiation losses of dense plasma streams of hydrogen isotopes; it is also important for the stimulation of chemical reactions by the availability of low-energy electrons for the intended reaction.

The above and other features of our invention will now be described in detail with reference to the accompanying drawings in which:

FIG. 11 is a plan view of a simplified linear accelerator according to our invention;

Figure 1:
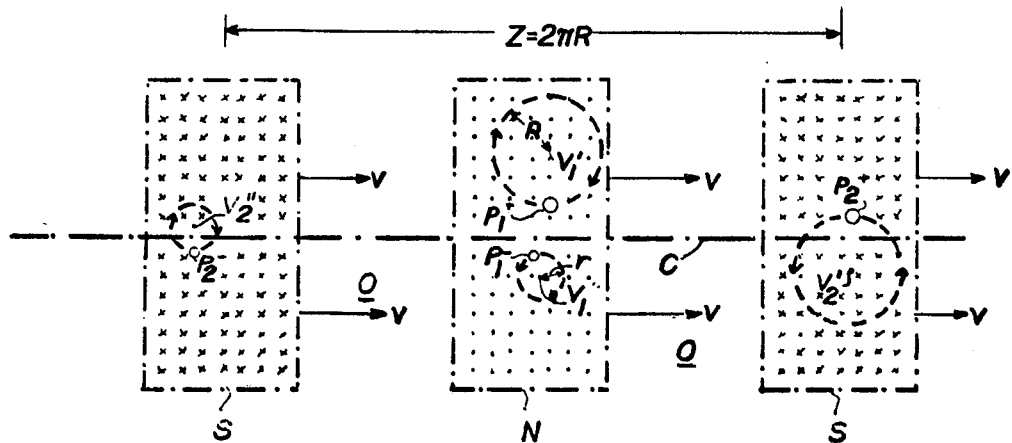
FIGS. 1 and 2 are diagrams serving to explain the mode of operation of a system according to our invention.
Figure 2:
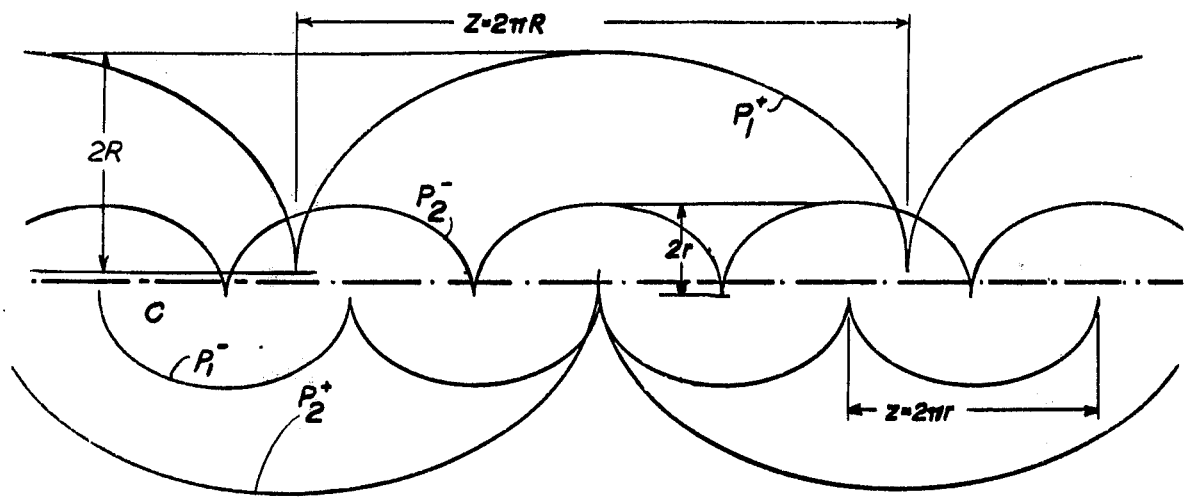

Reference will first be made to FIGS. 1 and 2 diagrammatically illustrating the principles underlying our invention. A traveling magnetic field, advancing along a centerline C of a nonillustrated vessel, consists of an alternation of north poles N and south poles S of flux density B with intervening neutral areas O. For purposes of illustration the boundaries between the polar and neutral areas have been sharply drawn, with the field strength assumed to be uniform throughout each polar zone; in reality, such uniformity may exist only in the transverse dimension (perpendicular to line C) with gradual reduction and eventual reversal of field strength between zones N and S.

Let us consider a positive particle $P_1^+$, such as a heavy ion of large mass/charge ratio, introduced into the vessel in the vicinity of centerline C and substantially without motion of its own at the instant when the zone N sweeps past it with a velocity $v$. Since this situation is tantamount to an injection of the particle at speed $-v$ into a static magnetic field of like intensity, the particle will be deflected into a circular orbit of radius $R = vm/qB$ about an axis $V_1'$ which is parallel to the lines of force and which for purposes of this discussion may be considered a field vector. The linear motion of this vector at speed $v$ converts this circle into a cycloidal undulation of pitch $Z = 2\pi R$ and height $2R$ as measured between its vertex and a baseline interconnecting its cusps. The absolute velocity of the particle in the direction of centerline C is zero at the cusps and $2v$ at the vertex, for an average of $v$ over the entire period.

A similar particle $P_2^+$, located in the same general area of the vessel at the instant when a zone S sweeps by, is deflected onto a cycloidal trajectory symmetrical to the one of particle $P_1^+$. In this case, too, the mean particle speed in the direction of line C is that of the associated field vector $V_2'$, namely $v$.

A negatively charged particle $P_1^-$ such as an electron, entrained by zone N is similarly deflected but in the opposite direction with reference to particle $P_1^+$, with a reduced pitch $z = 2\pi r$, $r$ being the radius of a circle traced by that particle about a field vector $V_1''$. Another such particle $P_2^-$ swept along by a zone S traces a cycloid centered on a field vector $V_2''$, this cycloid bulging in the same direction as particle $P_1^+$. The mean velocity of these negative particles in the direction of field propagation is also $v$.

The relative sizes of cycloids for ions and electrons shown in FIG. 1 do not represent the true proportions of their orbits, and are intended for showing the principle only. The real ratio of cycloid dimensions of the lightest ion — the proton — to the electron cycloid would be equal to the proton-electron mass ratio of 1836 to 1.

It may be assumed that, at a particular instant represented by the diagram of FIG. 1, zones S and N coincide with the locations of respective electromagnets energized in phase opposition as more fully described hereinafter, with other electromagnets in intermediate phases of excitation disposed therebetween. With the field strength at any one of these electromagnets varying harmonically between +B and −B, the instantaneous field values are sinusoidally related; at the gaps between these magnets, however, the stray field generated by the adjoining magnets has an amplitude appreciably below that of the sine wave so that the traveling polar zones fluctuate in intensity on passing from one magnet to the next. It is for this reason that we prefer to make the spacing of these magnets equal to an aliquot fraction of the pitch Z of the cycloid of the dominant particles $P^+$ (of FIG. 1), thereby insuring that each of these particles is subjected to the same acceleration at every cusp. The electrons $P^-$, whose cycloids generally do not span a whole number of magnet spacings, are more or less forced to keep pace with the large ions by electrostatic attraction. Smaller positive ions in the plasma may fall periodically out of step with the field, but since this may occur at points where their velocity component in the direction of propagation is either smaller or larger than that of the field, the net effect may substantially cancel so that their mean speed is approximately that of the dominant particles.

Figure 3:
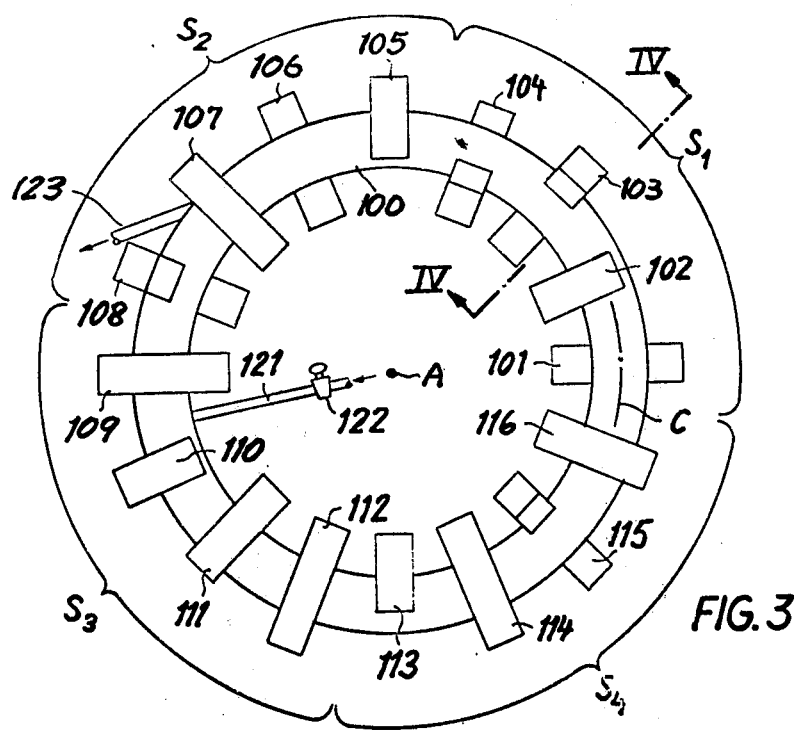
FIG. 3 is a plan view of a toroidal particle accelerator embodying our invention.
Figure 4:
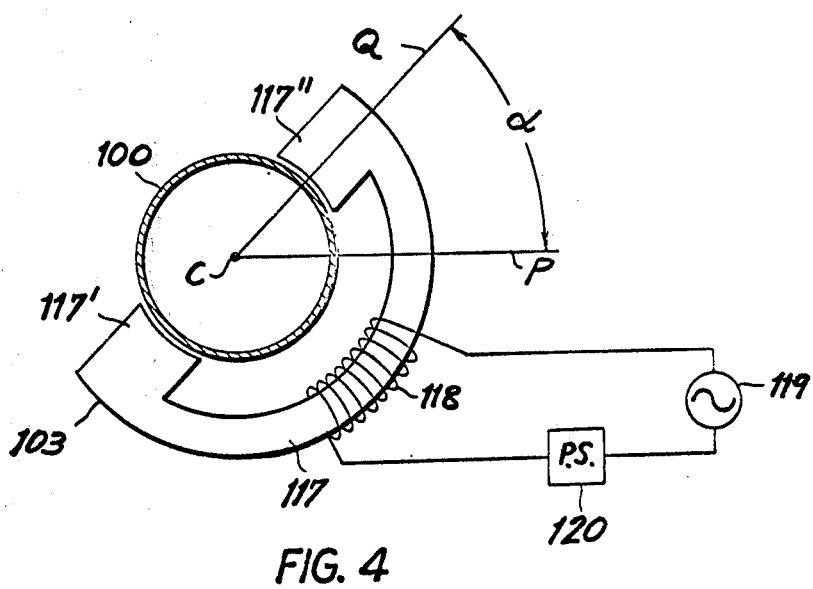
FIG. 4 is a cross-sectional view taken on the line IV — IV of FIG. 3, drawn to a larger scale.

The particle accelerator shown in FIGS. 3 and 4 comprises a toroidal vessel 100 of refractory material (e.g. quartz) closed against the atmosphere. A multiplicity of electromagnets 101 – 116 bracket the vessel 100 at locations angularly equispaced along its centerline C. Each of these electromagnets, as best illustrated for magnet 103 in FIG. 4, has a core 117 with pole faces 117', 117" and an exciter winding 118 connected across a high-frequency oscillator 119, common to all the electromagnets, by way of a phase shifter 120; this phase shifter may be common to several electromagnets which are cophasally excited as described below.

An inlet 121 provided with a stopcock 122 serves to admit electrically charged gas (e.g. an ionized reactant entering into the formation of a compound) into the vessel 100; an outlet for the reaction products has been shown at 123.

The pole faces 117', 117" have an axis Q which passes through the centerline C of the vessel 100 and includes an angle $\alpha$ with the plane P of that centerline which is perpendicular to the axis A of the toroid. The angle of inclination varies from one electromagnet to the next and changes progressively, by increments of 45°, for the odd-numbered magnets 101 ($\phi = 0$), 103 ($\phi = 45°$), 105 ($\phi = 90°$) . . . as well as for the even-numbered magnets 102 ($\phi = 270°$), 104 ($\phi = 315°$), 106 ($\phi = 0$) . . . It is seen, therefore, that each even-numbered magnet is offset by 90° from the preceding odd-numbered one.

Electrically, the annular array of magnets is divided into four sectors $S_1$, $S_2$, $S_3$, $S_4$ in which the phases of the corresponding magnets recur identically except for a reversal of polarity between adjoining sectors. Thus, the first two magnets of each sector such as 101, 102 or 105, 106 are cophasally excited with a phase shift $\phi = 0$ (sectors $S_1$, $S_3$) or $\phi = 180°$ (sectors $S_2$, $S_4$) with reference to the output of the common current supply 119; the phase shifter 120 of FIG. 4 may therefore be omitted in these instances, with simle crossing of the wires in the case of the even-numbered sectors. The last magnets of each sector such as 103, 104 or 107, 108 also form a cophasally excited pair, with $\phi = 90°$ (sectors $S_1$, $S_3$) or $\phi = 270°$ (sectors $S_2$, $S_4$). It should be noted, however, that this simplified relationship is not critical and that the phase angle could also vary progressively from one electromagnet to the next, exceeding, for example, by 30° the phase angles of the immediately preceding magnets.

The arrangement just described generates, in effect, two interleaved magnetic fields transverse to the circular centerline C and traveling along that line with a velocity equal to $\pi$ radians per cycle of the polyphase current from source 119 energizing the electromagnets 101 – 116. At the same time, on traversing a full circle, the orientation of the field vector with reference to the orbital plane P varies progressively, in 45° increments, by 360°.

Except for the negative and positive particles which recombine during the time of the movement of the field through $2\pi$ radians (two cycles of alternating current in the arrangement just described), each particle moves a full 360° in the course of every field revolution. Cycloidal undulations generally paralleling the centerline C are described by each particle, positive and negative, as discussed above.

If the axes Q of the driving electromagnets were coplanar, e.g. perpendicular to the vessel axis A as disclosed in the concurrently filed Ress application, focusing means generating a magnetostatic field would have to be provided for constraining the movement of the particles so that their cycloidally undulating trajectories remain confined to the interior of the toroidal vessel 100. This is required because the magnetic driving field is unable to counteract drift forces effective in the direction of this field. Such drift forces, liable to let the particles collide with the walls of the reactor, may be caused by mutual repulsion of individual particles, by inertial forces, by the effects of elastic collisions between the particles, or by interaction between space charges of groups of particles.

With the array of angularly offset driving magnets shown in FIGS. 3 and 4, however, any particle-velocity component directed toward the walls of the toroidal vessel 100 in one phase of the travel of that particle is transformed into a component parallel to the walls of the vessel in a later phase of its travel on account of the fact that the vectors of the driving field at that later phase of travel are inclined with reference to those previously effective. Thus, the cycloidal undulation of any particle is helically twisted about centerline C at the pitch of an imaginary helicoidal surface containing the polar axes Q.

Figure 5:
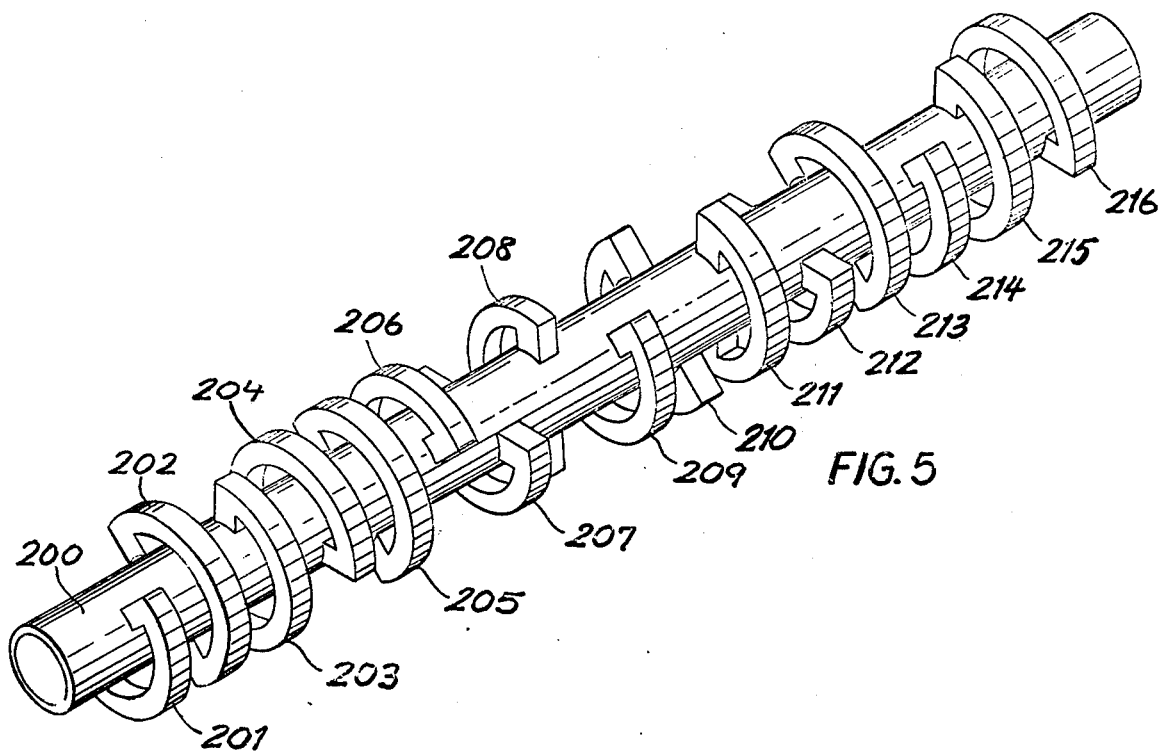
FIG. 5 is a perspective view of a linear particle accelerator according to our invention.

FIG. 5 shows a tubular vessel 200 which differs from vessel 100 by being linear rather than toroidal, the associated electromagnet having been designated 201 – 216. The mode of operation is the same as for the toroidal vessel 100 except, of course, that the particles move only once past each electromagnet if the direction of field travel is not changed. The inlet and outlet ports for the reactant are shown as the open ends of tubular vessel 200. The reactant gas entering the inlet port may be ionized by auxiliary ionization means not illustrated in FIG. 5.

Figure 15:
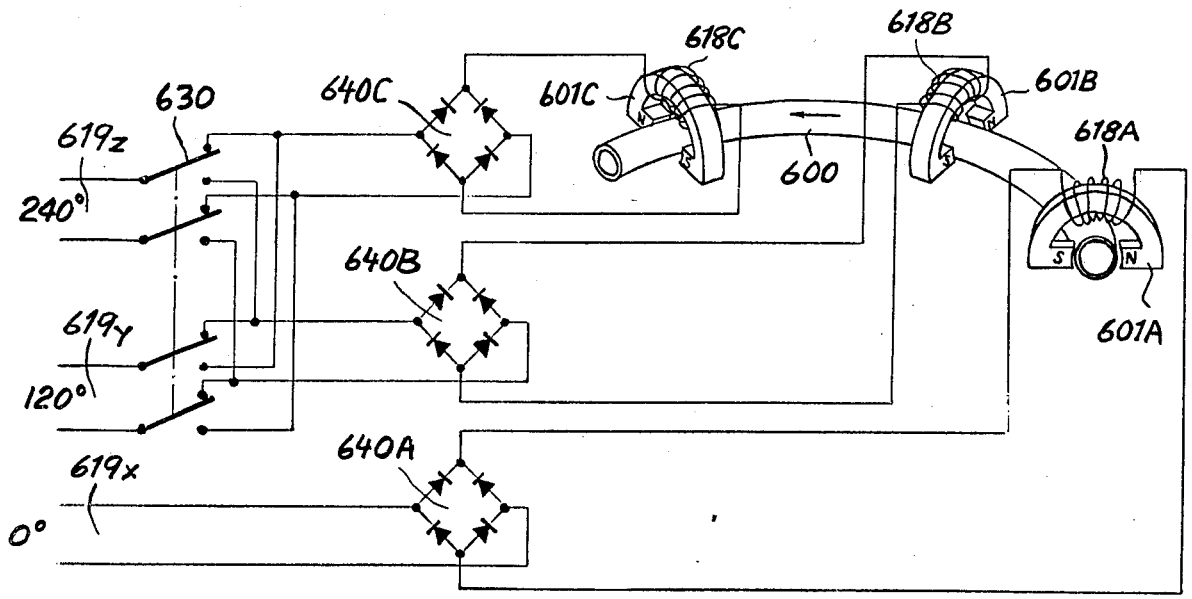
FIG. 15 is a circuit diagram of a power supply for an accelerator according to our invention.

In those applications in which prolonged containment of moving particles within the vessel 200 is desired, the phasing of the current feeding the electromagnets 201 – 216 may be periodically inverted, by switch means of the type shown in FIG. 15, to reverse the directions of travel of the magnetic field. Such periodic reversal causes reciprocation of the particles along the axis of the vessel 200; naturally, the length of a reciprocating cycle should be so chosen that the distance covered by the particles is less than the length of the vessel.

Figure 6:
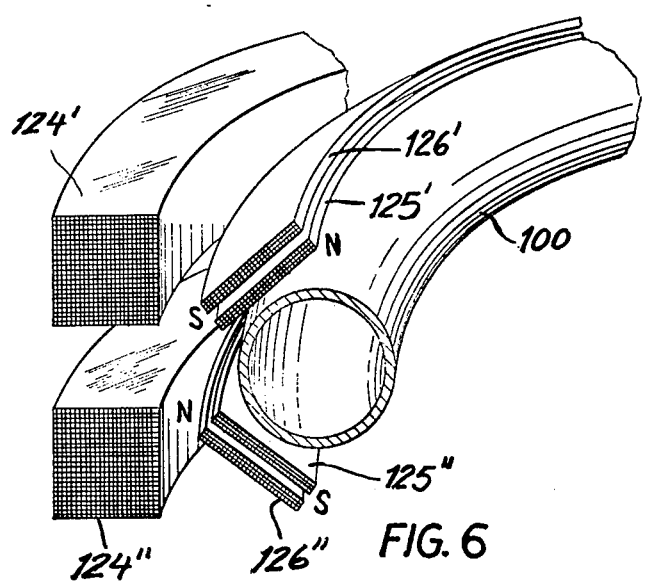
FIG. 6 is a perspective view of a segment of the accelerator of FIG. 3 provided with supplemental focusing means including a set of ancillary coils.

FIG. 6 shows part of the vessel 100 of FIG. 3 with omission of the drive magnets 101 – 116 for the sake of clarity. The containment of the charge in vessel 100 is aided by the provision of a pair of main direct-current coils 124', 124", centered on the toroid axis A (FIG. 3), and two pairs of relatively inclined ancillary coils 125', 126' and 125", 126" which generate a steady supplemental field in the vicinity of centerline C whereby the central field of coils 124', 124" may be reduced in intensity. The coils 125', 126' and 125", 126" form a pair of flat, elongate magnetic members flanking the vessel 100 and generate relatively inclined fluxes inside the vessel. Since these coils do not have any ferromagnetic cores, their permeability is the same as that of the surrounding space so as to leave unaffected the field generated by the driving magnets. It will be evident that similar coils, linear instead of annular, can also be used (without coils 124', 124") in a straight-line accelerator of the type shown in FIG. 5. In a toroidal vessel equipped with sufficiently strong focusing means 125', 126' and 125", 126", the coaxial coils 124', 124" can also be omitted.

Figure 7:
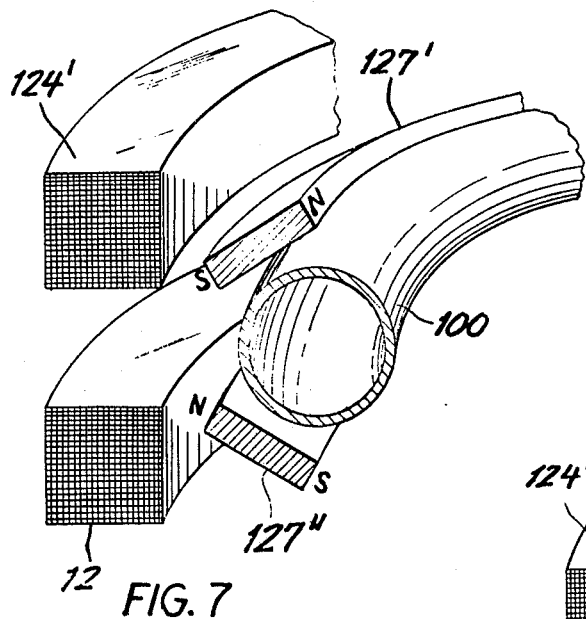
FIG. 7 is a view similar to FIG. 6, showing permanent magnets in lieu of the ancillary focusing coils.

In FIG. 7 we have shown an equivalent arrangement in which the flat, elongate focusing members are in the form of permanently magnetized strips with similar relative inclination. These magnets, which in modified form could also be used with a linear accelerator, are advantageously made from low-permeability material as described above.

Figure 8:
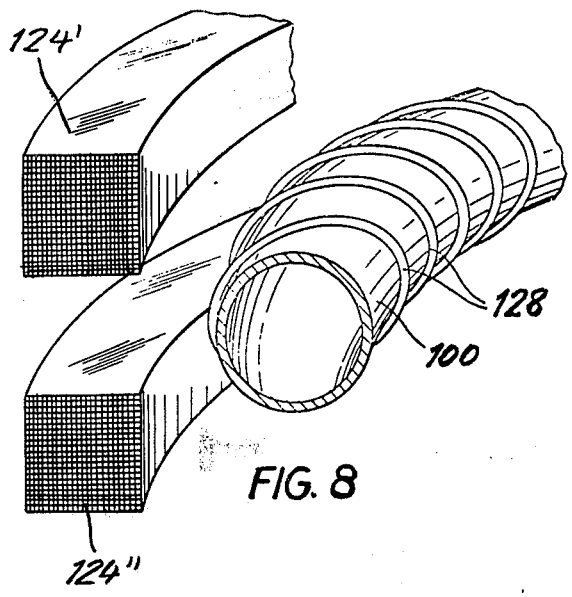
FIG. 8 is another view similar to FIG. 6, illustrating different supplemental focusing means.

FIG. 8 shows a coil 128, likewise traversed by direct current, enveloping the tube 100 in order to help contain the charge thereof. While such an enveloping coil would not be practical as a sole containment means, for the reasons already pointed out, it may also be used as a supplemental focusing element for a linear accelerator of the type shown in FIG. 5. The axially oriented coils 124', 124"may again be omitted in some instances. The coil 128 need not directly envelop the tube, as shown, but could be large enough to surround the driving electromagnets 101 – 116 or 201 – 216 of FIG. 3 or FIG. 5, or electromagnets 301 – 309 of FIG. 10 described hereinafter.

The focusing assemblies of FIGS. 6 –8 could also be used in a particle accelerator with coplanar polar axes perpendicular to the vessel axis as described and claimed in the concurrently filed Ress application.

Figure 9:
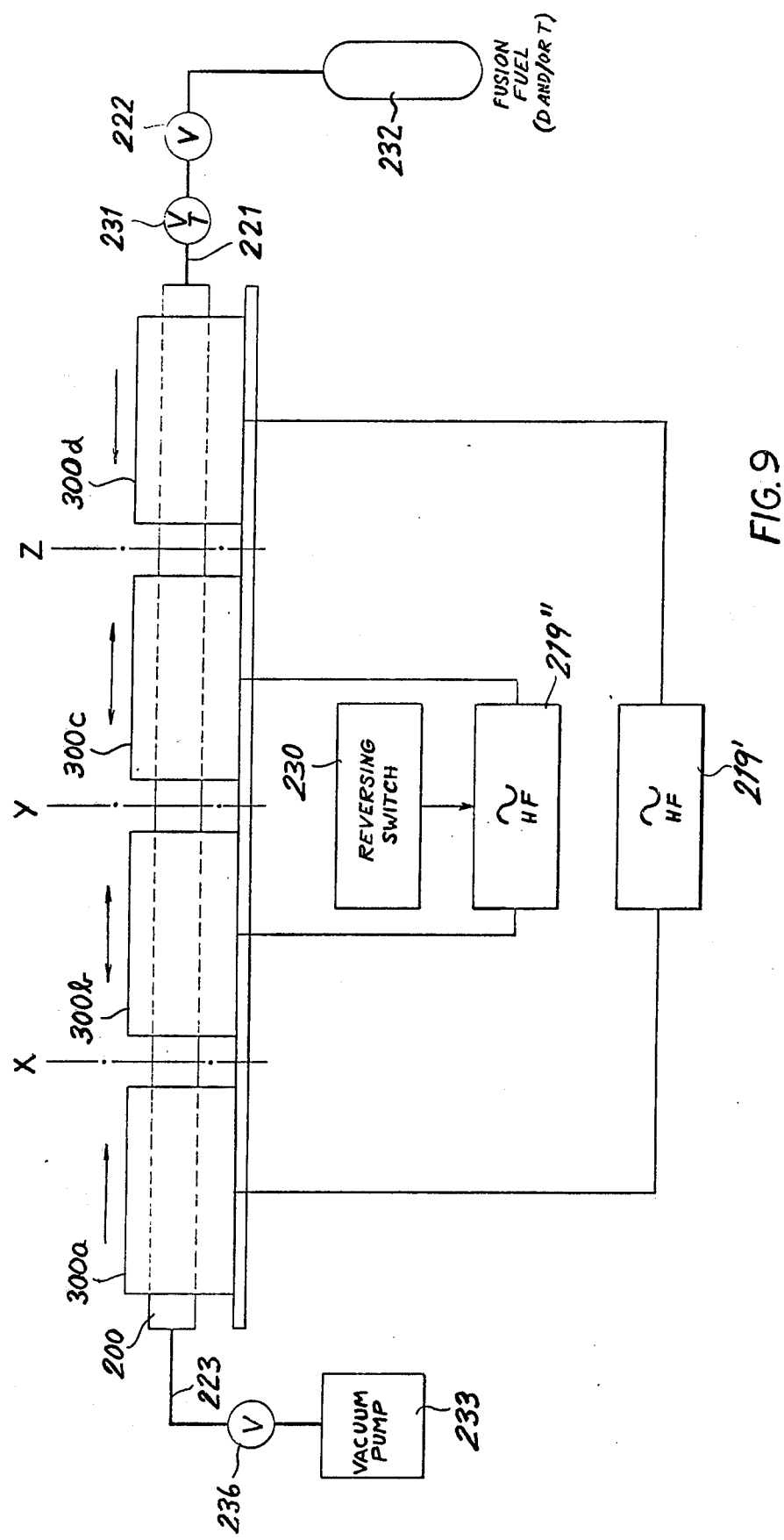
FIG. 9 is a diagrammatic view of a particle accelerator generally similar to that of FIG. 5 but axially divided into several sections with different driving modes.

FIG. 9 illustrates a linear reaction vessel 200, similar to that of FIG. 5, axially divided into four sections along transverse planes X, Y, Z. These sections are controlled by respective subsets of drive magnets similar to those shown at 201 – 216 and collectively designated 300a, 300b, 300c and 300d. The outer drive-magnet assemblies 300a and 300d are energized in mutual phase opposition from a first oscillator 219', the inner magnet assemblies 300b and 300c being also energized in mutual phase opposition from a second oscillator 219". The latter oscillator is periodically reversible, under the control of an electronic switch 230, whereby the charges in the sections controlled by assemblies 300b and 300c can be made to shuttle back and forth as indicated by the double-headed arrows. The charges in the outer sections of the vessel move toward each other as indicated by single-headed arrows. At the junctions X, Y, Z, therefore, these charges collide at a predetermined energy level. Such collisions may be utilized for nuclear fusion to generate heat which can be carried off by a fluid circulating through a heat exchanger (not shown) for utilization elsewhere, or the momentum of the colliding particles may be so chosen as to initiate a desired chemical reaction.

If the reactor is employed for nuclear fusion, rarefied deuterium and/or tritium is drawn into the right-hand end of tube 200 via an inlet 221, having a shut-off valve 222 in series with a throttle valve 231, from a reservoir 232 via a vacuum pump 233 connected to an outlet 223 at the left-hand end of the tube, this outlet being closable by a valve 236. These devices can also be used for handling the reactants and the end products of a chemical reaction taking place inside the vessel.

Figure 10:
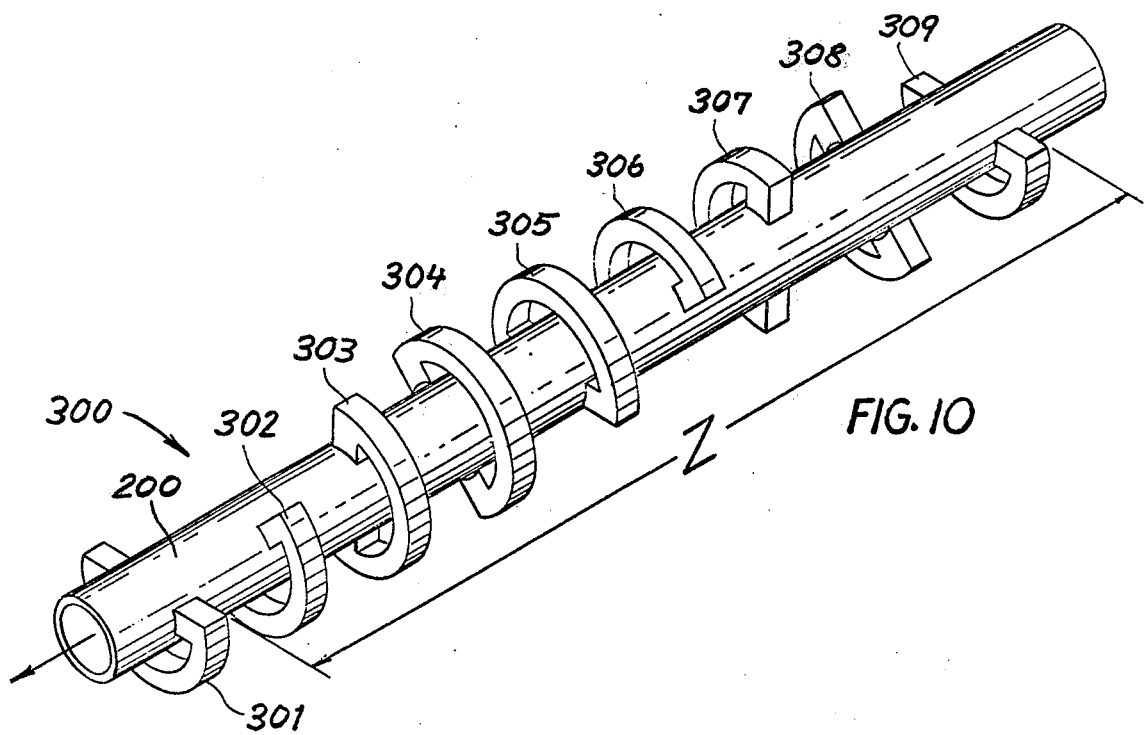
FIG. 10 is a perspective view similar to FIG. 5, showing a section of the linear accelerator of a modified design.

In FIG. 10 we have shown details of a driving assembly 300 for a linear accelerator, this assembly being representative of any of the sections 300a – 300d of FIG. 9. It comprises a subset of electromagnets 301 – 309 with angularly offset polar axes, similar to either of the two interleaved series of magnets 201, 203, . . . 215 and 202, 204, . . . 216 in FIG. 5. Their exciting coils, not shown, are energized from a source of polyphase alternating current with staggered phase angles varying monotonically, over a pitch length Z, in 45° increments equaling the relative offset of their polar axes; thus, magnets 301 – 309 are geomtrically parallel and cophasally excited to generate codirectional fluxes.

Figure 12:
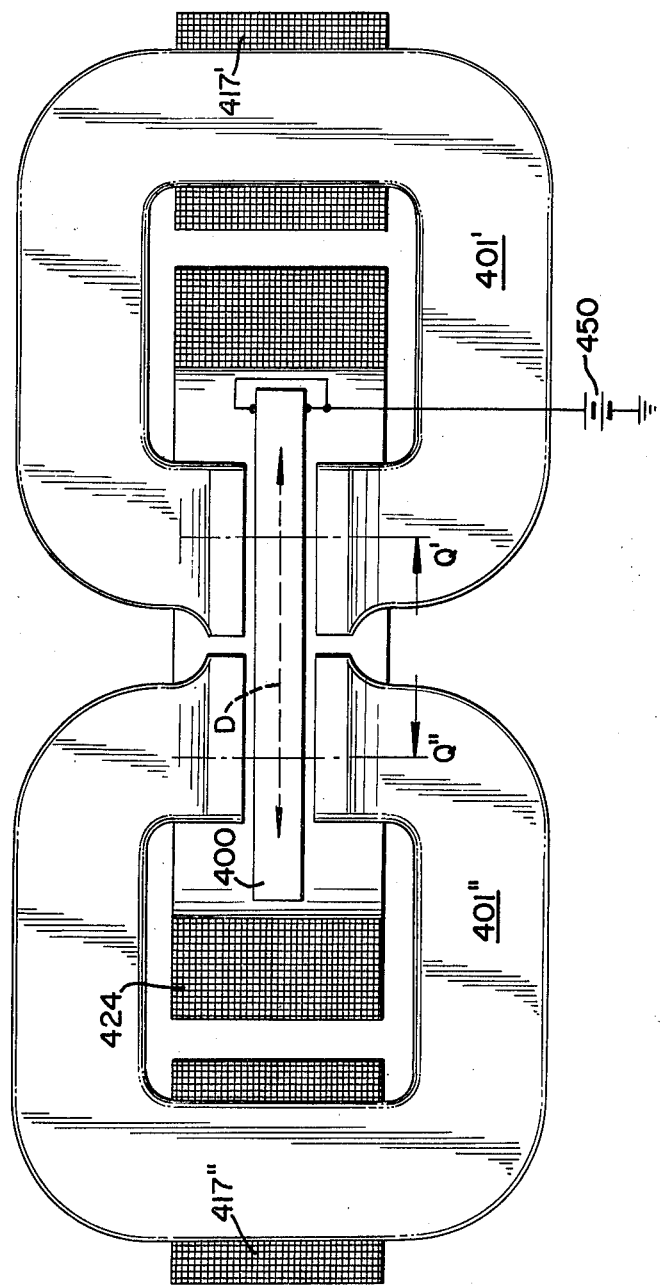
FIG. 12 is a cross-sectional view taken on the line XII — XII of FIG. 11.

FIGS. 11 and 12 illustrate a cylindrical vessel 400, coaxially surrounded by a biasing coil 424 energized with direct current, in which the particles are reciprocatingly entrained along a diametrical line D by a pair of coplanar electromagnets 401', 401" which windings 417', 417" are excited from an alternating-current source 419. The two windings are energized via respective full-wave rectifiers 440', 440" supplying them with raw-rectified currents whose pulsations are in quadrature owing to the insertion of a 90° phase shifter 420 between source 419 and rectifier 417". A similar effect, but at half the frequency, can be obtained without rectifiers and phase shifter by feeding the two windings from source 419 in phase opposition and superimposing upon the alternating current a direct current of a magnitude equal to the a-c peak amplitude. The resulting alternate excitation of magnets 401' and 401" with the same polarity has the effect of setting up a traveling field shuttling back and forth between their polar axes Q' and Q", with reciprocation of entrained particles along symmetrical cycloids. Advantageously, for reasons explained above, the separation of the polar axes Q' and Q" equals the pitch Z of the cycloid described by the dominant ion.

Figure 14:
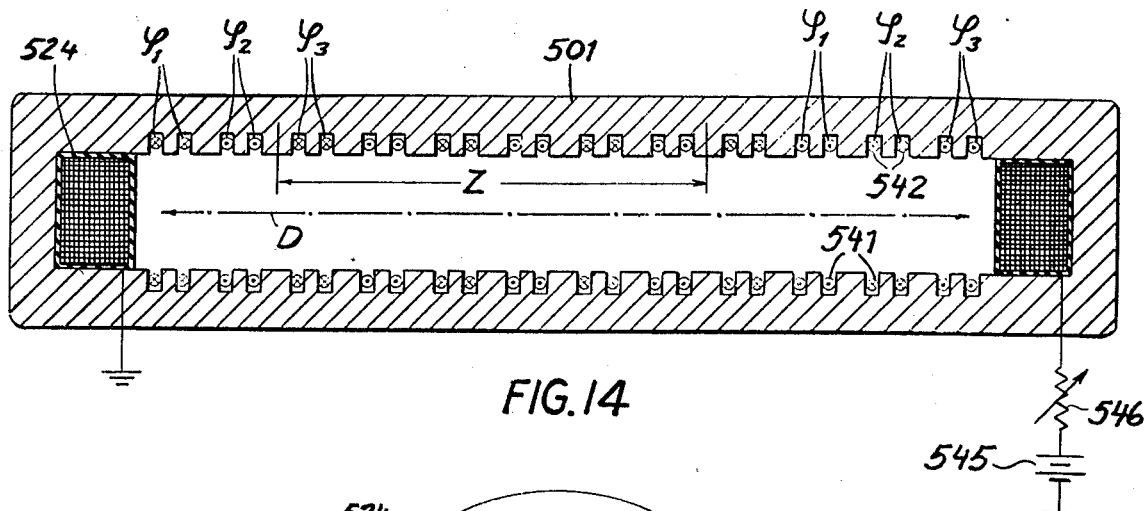
FIG. 14 is a cross-sectional view taken on the line XIV — XIV of FIG. 13.
Figure 13:
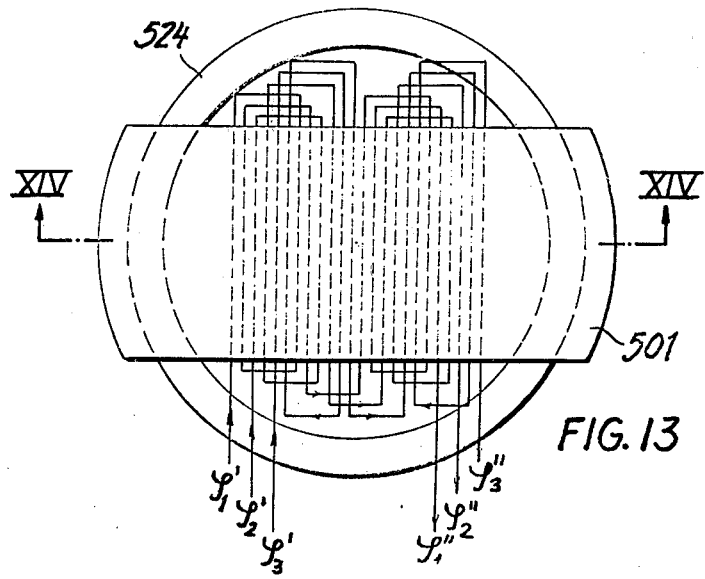
FIG. 13 is a plan view similar to FIG. 11, showing a partial modification.

A generally similar structure for the acceleration of charged particles along a diametrical line D within a cylindrical vessel such as that shown at 400 in FIGS. 11 and 12 has been shown in FIGS. 13 and 14. In FIG. 14, however, the vessel has been omitted for the sake of clarity. A yoke 501 of ferromagnetic material, extending in the direction of diameter D, brackets a biasing focusing coil 524 coaxially surrounding the vessel and is provided with slots 541, 542 along its lower and upper inner surfaces confronting the broad sides of the vessel, these slots lying in planes perpendicular to the diameter D. The slots are divided into three overlapping groups, here of eight slots each, occupied by respective phase windings $\phi_1$, $\phi_2$ and $\phi_3$ energized from respective phase leads of a nonillustrated three-phase current source. The input ends of these windings have been indicated in FIG. 13 at $\phi_1'$, $\phi_2'$, $\phi_3'$ whereas their output ends have been designated $\phi_1''$, $\phi_2''$, $\phi_3''$. Each phase winding forms several wire loops constituting cophasally and antiphasally excited electromagnets; the spacing of the cophasal loops along line D again corresponds to the pitch D of the cycloid described by the dominant ion. By periodically switching the phases of two of these windings, e.g. windings $100_2$ and $\phi_3$ (cf. FIG. 15), the sense of propagation can be reversed so that the entrained particles will be reciprocated within the confines of the vessel if the period of these reversals is less than the transit time of the particles along diameter D.

In a system of the type shown in FIGS. 11 – 14, the energization of d-c coil 424 or 524 may be varied (or completely cut off) to modify the effect of the traveling field upon the trajectory of the charged particles moving in an equatorial plane of vessel 400. In FIGS. 11 and 12, in which the traveling field is unipolar, energization of biasing coil 424 in aiding relationship with that field increases the effective value of B so as to reduce the radius R whereby particles of larger mass/charge ratio can be accommodated. In fact, selection of the proper amperage enables precise adjustment of the pitch of the cycloid of the dominant ion to correspond to the magnet spacing Z. In the system of FIGS. 13 and 14, the static field of coil 524 may be made equal to the traveling field B so as to suppress the negative magnet poles −B existing between positive poles +B, thereby effectively rectifying the magnetic wave; further intensification of the static field can then again be used to change the pitch of the cycloid and the lateral excursion 2R of the dominant ion. A source of adjustable direct current for coil 524 has been illustrated schematically as a battery 545 in series with a variable resistor 546.

Since in the accelerators of FIGS. 11 –14 there is no magnetic force restraining the drift of particles in axial direction, electrostatic repulsion may be used to prevent such drift by particles of a selected polarity, i.e. those most essential to the desired reaction. Thus, as shown in FIG. 12, the upper and lower end faces (which may be coated both internally and externally with thin conductive films (can be connected to a voltage source 450, here positive, acting capacitively from the outer faces upon the inner faces which thereby acquire a high potential of the proper polarity to keep the reactant ions away.

In FIG. 15 we have shown a set of electromagnets 601A, 601B, 601C whose windings 618A, 618B, 618C are energized, with phase differences of 120°, from a three-phase source having phase leads 619x, 619y and 619z respectively connected to these windings via full-wave rectifiers 640A, 640B, 640C. A reversing switch 630 is operable, manually or automatically, to interchange the connections between windings 601B, 601C and phase leads 619y, 619z for reversing the direction of travel of a magnetic field along a particle track formed by a vessel 600. This vessel, illustrated only in part, is shown to be toroidal but could also be linear or of any other configuration. The polar axes of the magnets all lie in a plane transverse to the axis of the toroid, as in the concurrently filed Ress application, and an axially oriented focusing field may be supplied by a coil not shown in this Figure and/or by annular magnetic members of the type illustrated in FIGS. 6 and 7. The group of magnets 601A – 601C may be duplicated along other sectors of the vessel, with cophasal excitation of correspondingly positioned magnets of the several groups; in the illustrated switch position, the order of excitation is 601A, 601B, 601C, so that particles are entrained in the direction indicated by the arrow. The raw rectification of the phase currents establishes an invariable polarity for the pulsating magnetic fields of all magnets, their north poles having been shown disposed on the convex side of the vessel. Thus, as explained above, the dominant ions will have trajectories curving only in one direction (for a given sense of propagation) so that the width of the vessel may be less than would be otherwise necessary.

If desired, the vessels shown in the various Figures may be provided with electrodes for ionizing the injected gas molecules as is well known per se.

Figure 16:
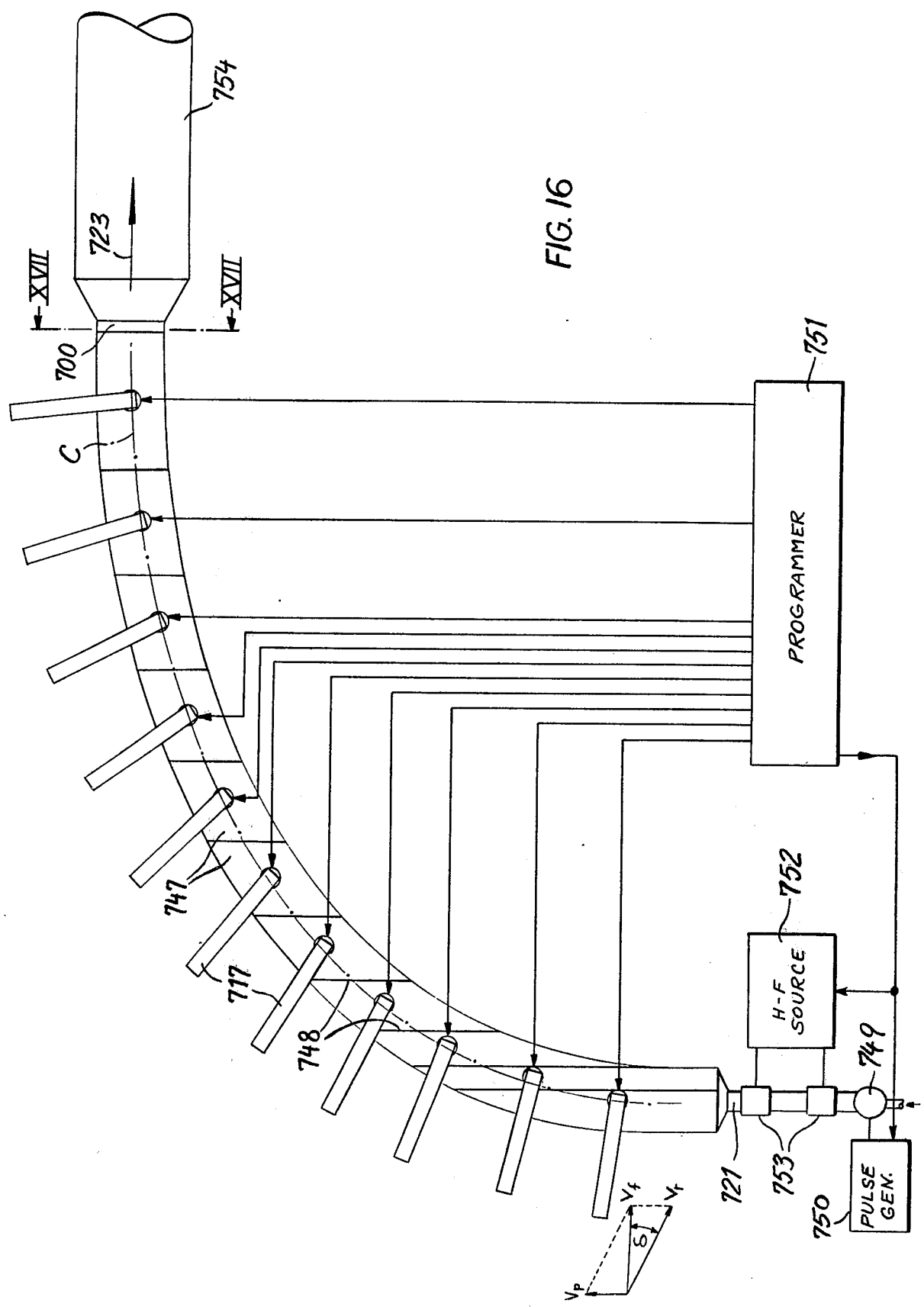
FIG. 16 is a diagrammatic plan view of a modified particle accelerator according to our invention.
Figure 17:
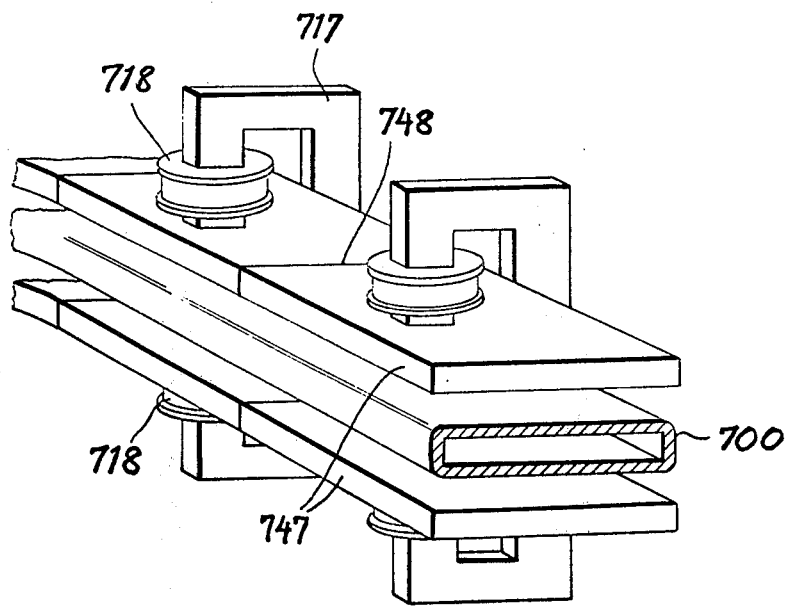
FIG. 17 is an enlarged perspective detail view taken on the line XVII — XVII of FIG. 16.

In FIGS. 16 and 17 we have shown an accelerator in accordance with our invention designed to produce a laminar plasma flow. This accelerator comprises a vessel 700 in the shape of a flattened tube of rectilinear cross-section curved along a half-cycloid in a plane parallel to its major surfaces. These major surfaces are overlain by flat, plate-shaped pole shoes 747 of a series of electromagnets 717 provided with energizing windings 718. The pole shoes adjoin one another along boundaries 748 which lie in mutually parallel planes (vertical in the presentation of FIG. 16); these planes include progressively larger angles with the centerline C of the vessel 700 with increasing distance from an inlet 721 serving for the injection of charged particles into the vessel. In the vicinity of that inlet, the planes of boundaries 748 are almost parallel to centerline C so that the field gradient thereacross, and hence the direction of field travel, is nearly perpendicular to the direction of particle injection; this injection is controlled by an electromagnetic valve 749 which is periodically opened by a pulse generator 750, in response to signals from a programmer 751 which also activates a high-frequency power source 752 connected to a pair of ionization electrodes 753 embracing the inlet 721. Programmer 751 further controls the staggered energization of coils 718 in such a way that the magnetic-field vector traverses each boundary 748 at the instant when the injected particles cross the plane of that boundary. The instant of vector crossover coincides with the disappearance of the field gradient across the boundary, occurring thus when the fields on opposite sides of the boundary are equal.

If the particles reached the first boundary proximate to inlet 721) with zero velocity (with the instantaneous magnetic field assumed to be directed downwardly into the plane of the paper in FIG. 16) the absolute speed $v_f$ of the field would deflect the particles upwardly, i.e. on a line tangent to centerline C. However, the particles are injected with an initial speed $v_p$ so that the relative field velocity $v_r$ includes with the direction $v_f$ an angle δ causing a corresponding inclination of the particle trajectory. The progressive acceleration of the particles calls for a corresponding increase in the spacing of the boundary intersections with the centerline in the direction away from inlet 721. The last boundary, at the vertex of the half-cycloid, is substantially perpendicular to the centerline so that the traveling field at that point has only a focusing effect.

If the coils 718 are energized with alternating current, particles are injected in a single burst per cycle; with a raw-rectified driving current a burst occurs at the beginning of each half-cycle.

Vessel 700 discharges at an outlet 723 into a reaction chamber 754 which the generated plasma stream enters at a velocity equal to twice the speed of the traveling magnetic field.

Figure 18:
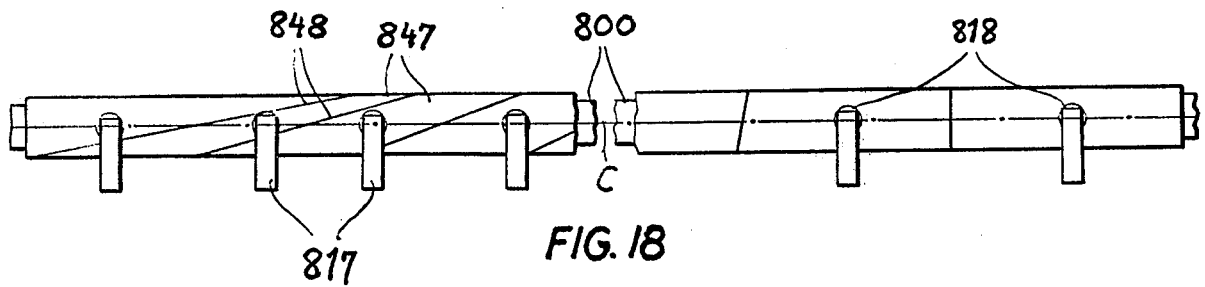
FIG. 18 is a view similar to FIG. 16, illustrating a modification.

By deviating from the parallelism of consecutive pole-shoe boundaries, as illustrated in FIG. 18, we can modify the trajectory of the particles to change their path from a substantially semi-cycloidal one to an approximately rectilinear one so that they can pass axially through a straight vessel 800 otherwise similar to vessel 700 of FIGS. 16 and 17. The first boundary 848 between pole shoes 847, energized in the aforedescribed manner by electromagnets 817 with coils 818, is nearly parallel to the vessel axis or centerline C whereby the particles, in view of their initial injection velocity, move substantially axially toward the next boundary. The progressively increasing angle included between successive boundaries and the centerline C straightens the trajectory of the particles to let them exit at the opposite (right-hand) end of vessel 800 with a velocity again equaling about double the speed of the traveling field.

It will be evident that other track configurations, intermediate those of FIGS. 16 and 18, could be realized with different orientation of the pole-shoe boundaries. Moreover, the intensity of the driving field should be adjustable for the purpose of accelerating plasmas with dominant ions having different mass/charge ratios. Since the transmit time of the plasma also depends on the mass/charge ratio of the dominant ion, the frequency of the driving current should likewise be adjustable.

The reaction chamber 754 in FIG. 16 may contain a liquid or gas with which the charged particles accelerated in vessel 700 (or 800) are to interact; these particles could also be trained upon a solid object to modify its surface characteristics as discussed above.

An accelerator of the type shown in FIGS. 16 – 18 may be used, for example, to generate deuterium-plasma beams with ion energies exceeding 20,000 electron-volts. Such beams, on impinging upon a cold metal target coated with lithium deuteride or lithium tritide, induces nuclear collisions which cause neutrons to be emitted from the target at a rate depending upon the amplitude of the deuterium-plasma current. Controlled neutron sources of this kind are useful in neutron radiography and for the conversion of stable elements into radioactive isotopes.

Figure 19:
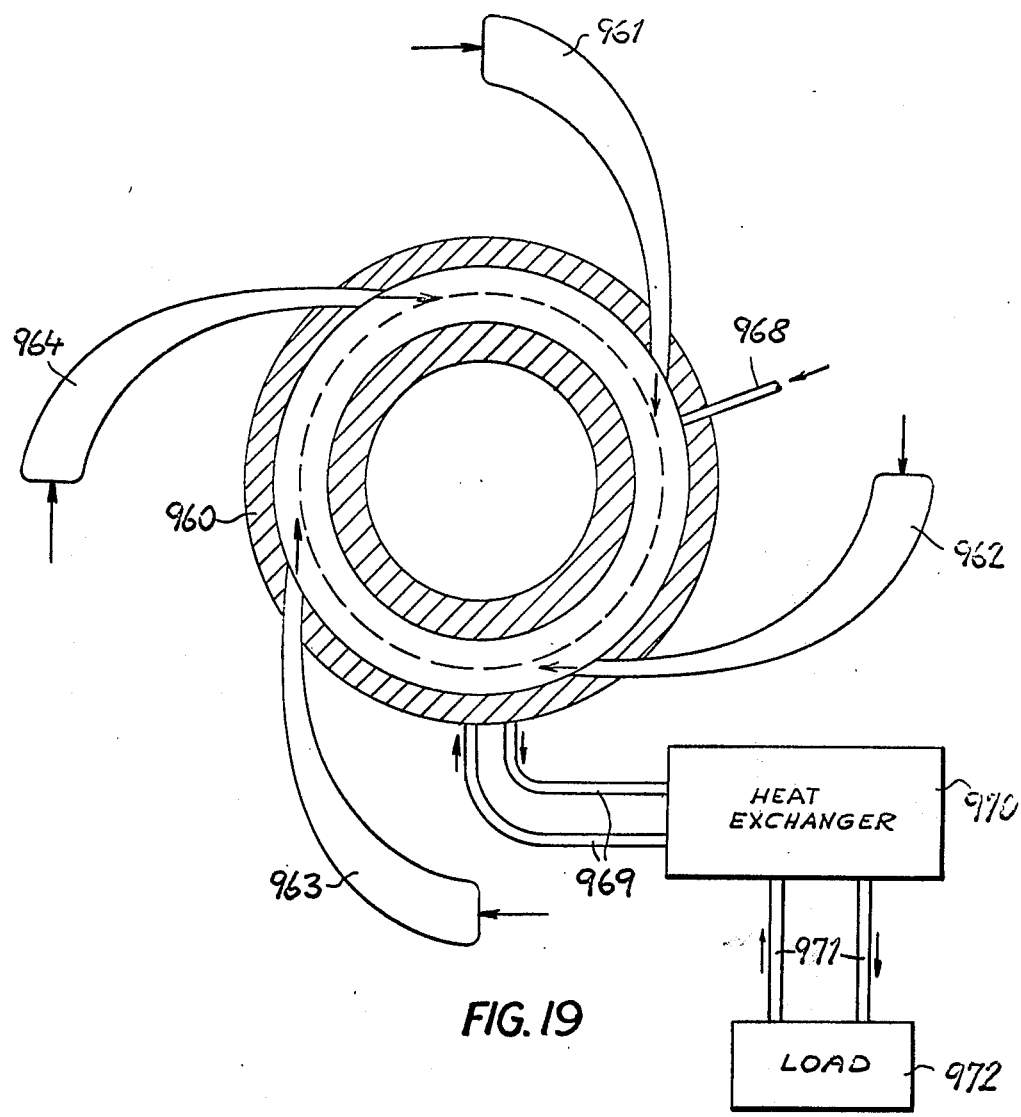
FIG. 19 is a diagrammatic sectional plan view of a nuclear reactor incorporating several accelerators of the type shown in FIG. 16.
Figure 20:
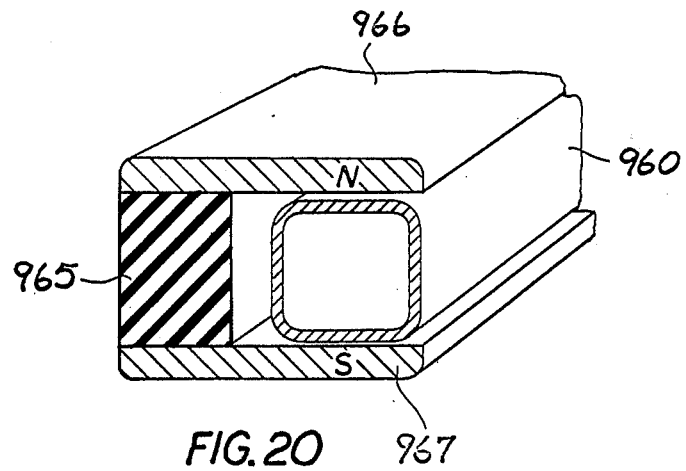
FIG. 20 is a perspective sectional detail view of part of the reactor of FIG. 19.

In FIGS. 19 and 20 we have illustrated another aspect of our invention, i.e. a reactor for the excitation of large-scale nuclear fusion as a source of thermal power. This system comprises an annular vessel 960 forming a closed loop for the circulation of charged particles introduced at peripherally spaced locations by four branch channels 961, 962, 963 964 each similar to the half-cycloidal accelerator of FIG. 16. (In contradistinction to the schematic showing of vessel 700, these branch channels are shown to converge from their input ends to their output ends, which affords more room to accommodate the nonillustrated driving magnets). The charged particles injected by these branch channels into vessel 960 circulate therein under the control of a magnetostatic field parallel to the vessel axis, this field being generated by a peripheral array of permanent magnets 965 which are bracketed by annular pole pieces 966 and 967. The intensity of this magnetostatic field is so chosen that the particles, at their laminar flow velocities, do not strike the walls of their circular track.

One or more ancillary inlets 968 (only one shown) serve for the admission of small amounts of gas whose molecules collide with the circulating high-energy particles to release neutrons and to generate heat. The heat is carried off by a cooling fluid in a conduit system 969 passing through the walls of reactor vessel 960 and is transferred in a heat exchanger 970 to a secondary coolant circuit 971 for delivery to a load 972, e.g. to a generator of steam or electric power. The use of heat exchanger 970 isolates the load against radioactive contamination as is well known per se.

In a specific instance, the plasma beams introduced into reactor vessel 960 via branch channels 961 – 964 contains a large concentration of deuterium ions accelerated to 40,000 electron-volts at the point of their tangential entry into the circular storage loop. In order to achieve a flow density in vessel 960 substantially exceeding that of is feeder streams, the accelerators 961 – 964 are simultaneously operated at full power prior to injection of additional deuterium via inlet 968. Following the initiation of nuclear fusion, the plasma flow into the accelerators 961 – 964 is reduced to a sustaining level designed to compensate for the relatively small radiation and turbulence losses of the nearly laminar flow in vessel 960 and for the acceleration and ionization energy consumed by the relatively minor quantities of cold deuterium gas fed in at 968.

The boundaries 748, 848 in FIGS. 16 – 18 may be formed by small airgaps or by strips of nonmagnetic material inserted between the pole shoes.

We claim:

1. In a reactor for charged particles, comprising in combination:
    a central storage vessel enveloping a closed track for the circulation of positively and negatively charged particles, and
    a plurality of branch channels opening into said central storage vessel in a tangential direction to said closed track at spaced apart locations, each of said branch channels having an end remote from said central storage vessel provided with a source of substantially equal numbers of positive and negative particles injected in the general direction of the centerline of the respective branch channel and with a set of electromagnets disposed along said centerline; and
    control means for periodically energizing the source of particles and the electromagnets of each of said branch channels for producing a dense stream of positive and negative particles circulating in said central storage vessel.

2. The combination as defined in claim 1, wherein said central storage vessel is annular and centered on an axis, further comprising magnetostatic means generating a steady focussing field parallel to said axis for maintaining said dense stream of positive and negative particles in circulation along said closed track.

3. An accelerator for charged particles, comprising:
    a vessel having a starting point and adapted to enclose a stream of positively and negatively charged particles along a preselected open-ended track,
    drive means juxtaposed with said vessel for generating therein a magnetic field traveling in a preselected direction relative to each point of said track, with the magnetic flux vector of said field transverse to said track at all points, thereby setting said particles in motion,
    said drive means comprising a set of electromagnetics with pole pieces spaced along the track, and a source of alternating current connected to said electromagnets in staggered phase relationship,
    said pole pieces having adjoining edges that are generally parallel to said track at said starting point, and progressively approach perpendicularity to said track with increasing distance from said starting point, and
    means for producing charged particles and introducing same at the starting point of said track,
    control means for pulsing said charged particles in a preselected phase relationship with said traveling magnetic field.

4. An accelerator according to claim 3 which includes a plurality of surfaces within said vessel carrying electrostatic charges with an adjustable high voltage source for sustaining said charges.

5. An accelerator for positively and negatively charged particles, comprising:
    a central storage vessel enveloping a closed track for the circulation of a gaseous ionized reactant consisting of a substantially neutral mixture of positive and negative charged particles, comprising a set of steady-flux magnets along said closed track to maintain a magnetic flux essentially parallel to the axis of said reactant circulation, and means for removing any heat from said central storage vessel generated by any chemical, electrical, or nuclear processes stimulated by said reactant circulation;
    at least one charged particle accelerator injecting an ionized reactant tangentially into a closed circulation track, said charged particle accelerator comprising:
    a vessel adapted to enclose a stream of negatively and positively charged particles along a preselected open-ended track,
    drive means juxtaposed with said vessel for generating therein a magnetic field traveling in a preselected direction relative to each point of said open-ended track with the magnetic flux vector of said field transverse to said open-ended track at all points thereby setting said particles in motion, said drive means comprising a set of electromagnets with pole pieces spaced along said open-ended track, and a supply of alternating current connected to said electromagnets in staggered phase relationship, wherein the adjoining edges of said pole pieces are generally parallel to said track at the starting point, and progressively approach perpendicularity to said open-ended track with increasing distance from said starting point, means for ionizing said reactant and introducing same at the starting point of said open-ended track, with control means for pulsing said ionized reactant source in a preselected phase relationship to the traveling magnetic field to accelerate said reactant into a substantially laminar flow mode for achieving turbulence-free injection and circulation in said central storage vessel, surfaces carrying electrostatic charges within all accelerator vessels and the central storage vessel for repelling any reactant ions deviating from their predetermined paths, thus further reducing the ion collision rate with any vessel walls.

6. An accelerator as defined in claim 5, further comprising an adjustable high voltage source connected to said surfaces carrying electrostatic charges.

7. An accelerator for charged particles, comprising:

a vessel adapted to enclose a stream of charged particles along a preselected open-ended track;

drive means juxtaposed with said vessel for generating therein a magnetic field traveling in a preselected direction relative to each point of said track with the magnetic flux vector of said field transverse to said track at all points, thereby setting said particles in motion along said track with a velocity having a predetermined relation to the velocity of said traveling field, wherein said drive means comprises a set of electromagnets spaced along said track and a supply of alternating current connected to said electromagnets for exciting same in staggered phase relationship; and a storage vessel enveloping the circulation of positively and negatively charged particles along a closed track, the charged particles being injected into said track tangentially by at least one accelerator.

8. An accelerator for charged particles, comprising:

a vessel adapted to enclose a stream of charged particles along a preselected open-ended track;

drive means juxtaposed with said vessel for generating therein a magnetic field traveling in a preselected direction relative to each point of said track with the magnetic flux vector of said field transverse to said track at all points, thereby setting said particles in motion along said track with a velocity having a predetermined relation to the velocity of said traveling field, wherein said drive means comprises a set of electromagnets spaced along said track and a supply of alternating current connected to said electromagnets for exciting same in staggered phase relationship; and a storage vessel enveloping the circulation of positively and negatively charged particles along a closed track, the charged particles being injected into said closed track tangentially by at least one accelerator, further comprising means for removing any heat generated by chemical, electrical or nuclear processes stimulated by said particle circulation.

9. An accelerator for charged particles, comprising:

a vessel adapted to enclose a stream of charged particles along a preselected open-ended track;

drive means juxtaposed with said vessel for generating therein a magnetic field traveling in a preselected direction relative to each point of said track with the magnetic flux vector of said field transverse to said track at all points, thereby setting said particles in motion along said track with a velocity having a predetermined relation to the velocity of said traveling field, wherein said drive means comprises a set of electromagnets spaced along said track and a supply of alternating current connected to said electromagnets for exciting same in staggered phase relationship; and a storage vessel enveloping the circulation of positively and negatively charged particles along a closed track, the charged particles being injected into said closed track tangentially by at least one accelerator, further comprising magnetostatic means providing along said closed track with the magnetic flux vector substantially parallel to the axis of said particle circulation.

10. An accelerator for charged particles, comprising:

a vessel adapted to enclose a stream of charged particles along a preselected open-ended track;

drive means juxtaposed with said vessel for generating therein a magnetic field traveling in a preselected direction relative to each point of said track with the magnetic flux vector of said field transverse to said track at all points, thereby setting said particles in motion along said track with a velocity having a predetermined relation to the velocity of said traveling field, wherein said drive means comprises a set of electromagnets spaced along said track and a supply of alternating current connected to said electromagnets for exciting same in staggered phase relationship; and a storage vessel enveloping the circulation of positively and negatively charged particles along a closed track, the charged particles being injected into said tangentially by at least one accelerator, providing a plurality of surfaces carrying electrostatic charges along said closed track of said storage vessel for preventing wall collisions of charged particles of a preselected polarity.

11. A method for accelerating a mixture of positive and negative particles along an open-ended track, comprising the step of injecting a plasma of positive and negative particles into an open-ended track, while applying a magnetic field traveling in a preselected direction relative to each point of said track, with the magnetic flux vector of said field transverse to said track at all points.

12. A method for accelerating a mixture of positive and negative particles along an open-ended track into a substantially laminar flow mode, comprising the steps in combination:

periodically applying a magnetic field traveling in a preselected direction relative to each point of said track, and admitting said positively and negatively charged particles to the starting point of said track in a preselected time relationship to the periodicity of said magnetic field.

13. A method for generating a substantially laminar circulation of a mixture of ions and electrons along a preselected closed track, comprising the steps in combination:

accelerating said ions and electrons to a substantially equal velocity in the same direction; and injecting said accelerated mixture of ions and electrons into a steady-flux magnetic field with the magnetic flux vector transverse to the velocity vector of said particle mixture, and essentially parallel to the axis of particle circulation.

* * * * *